US008892542B2

(12) United States Patent
Wang et al.

(10) Patent No.: US 8,892,542 B2
(45) Date of Patent: Nov. 18, 2014

(54) CONTEXTUAL WEIGHTING AND EFFICIENT RE-RANKING FOR VOCABULARY TREE BASED IMAGE RETRIEVAL

(75) Inventors: Xiaoyu Wang, Columbia, MO (US); Ming Yang, Sunnyvale, CA (US); Timothee Cour, San Francisco, CA (US); Shenghuo Zhu, Santa Clara, CA (US); Kai Yu, Santa Clara, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 474 days.

(21) Appl. No.: 13/339,227

(22) Filed: Dec. 28, 2011

(65) Prior Publication Data
US 2012/0221572 A1 Aug. 30, 2012

Related U.S. Application Data

(60) Provisional application No. 61/446,409, filed on Feb. 24, 2011.

(51) Int. Cl.
G06F 17/30 (2006.01)
G06F 7/00 (2006.01)

(52) U.S. Cl.
USPC .......................................... 707/707; 707/737

(58) Field of Classification Search
CPC ..................... G06F 17/30247; G06F 17/30259
USPC ......................................................... 707/737
See application file for complete search history.

(56) References Cited

U.S. PATENT DOCUMENTS

| | | | | |
|---|---|---|---|---|
| 4,843,569 A * | 6/1989 | Sawada et al. | ................ | 382/180 |
| 5,010,500 A * | 4/1991 | Makkuni et al. | ............... | 715/863 |
| 5,710,916 A * | 1/1998 | Barbara et al. | ......... | 707/999.003 |
| 6,182,069 B1 * | 1/2001 | Niblack et al. | ......... | 707/999.006 |
| 6,321,232 B1 * | 11/2001 | Syeda-Mahmood | .. | 707/999.102 |
| 6,642,929 B1 * | 11/2003 | Essafi et al. | ................... | 345/581 |
| 8,787,682 B2 * | 7/2014 | Yang et al. | ................... | 382/224 |
| 2007/0217676 A1 * | 9/2007 | Grauman et al. | ............. | 382/170 |
| 2008/0301133 A1 * | 12/2008 | Brown et al. | ..................... | 707/6 |
| 2012/0243789 A1 * | 9/2012 | Yang et al. | ................... | 382/195 |

OTHER PUBLICATIONS

David Nister and Henrik Stewenius, Scalable Recognition with a Vocabulary Tree, CVPR 2006.
Herve Jegou and Matthijs Douze and Cordelia Schmid, Improving Bag-of-Feature for Large Scale Image Search, IJCV 2010.
Shillong Zhang and Qingming Huang and Gang Huai and Shuqiang Jiang and Wen Gao and Qi Tan. Building Contextual Visual Vocabulary for Large-scale Image Applications, ACM MM 2010.
David Lowe, Distinctive Image Features, from Scale-Invariant Keypoints, International Journal of Computer Vision, Jan. 5, 2004.
Yan Ke et al, Efficient Nearduplicate Detection and Subimage Retrieval, MM'04, Oct. 1016, 2004, New York, New York, USA.
Sivic et al, Video Google: A Text Retrieval Approach to Object Matching in Videos, Proceedings of the Ninth IEEE International Conference on Computer Vision (ICCV 2003) 2-Volume Set.

* cited by examiner

*Primary Examiner* — Pavan Mamillapalli
(74) *Attorney, Agent, or Firm* — Joseph Kolodka

(57) ABSTRACT

Systems and methods are disclosed to search for a query image, by detecting local invariant features and local descriptors; retrieving best matching images by quantizing the local descriptors with a vocabulary tree; and reordering retrieved images with results from the vocabulary tree quantization.

14 Claims, 5 Drawing Sheets

Example of features which have similar descriptors but different neighborhood statistics

CONTEXTUAL WEIGHTING AND EFFICIENT RE-RANKING FOR VOCABULARY TREE BASED IMAGE RETRIEVAL

The present application claims priority to Provisional Application Ser. No. 61/446,409 filed Feb. 24, 2011, the content of which is incorporated by reference.

BACKGROUND

The present application relates to systems and methods for image retrieval.

Retrieval of visually similar images from large databases is becoming important for many commercial applications. In one exemplary application, query images are captured by phone cameras and compared against a database with millions of original digital copies with a single image for each object. This scenario presents some unique challenges: the digital copies may appear quite different from their physical counterparts, especially because of lighting, reflections, motion and out-of-focus blur, not to mention significant viewpoint variations.

In terms of the methodologies and features, recent large-scale image retrieval algorithms may be categorized into two lines: 1) compact hashing of global features; and 2) efficient indexing of local features by a vocabulary tree. Global features such as GIST features or color histograms delineate the holistic contents of images, which can be compactly indexed by binary codes or hashing functions. Thus, the retrieval is very efficient on both computation and memory usage though it is unable to attend to the details of images. In the other line of work, images are represented by a bag of local invariant features which are quantized into visual words by a huge vocabulary tree. This vocabulary tree based retrieval is very capable of finding near-duplicate images, i.e., images of the same objects or scenes undergoing different capturing conditions, at the cost of memory usage for the inverted indexes of a large number of visual words.

In the large hierarchical vocabulary tree, local features are encoded into a bag-of-words (BoW) histogram with millions of visual words. This histogram is so sparse that inverted index files are well suited to implement the indexing and searching efficiently. Visual words are conventionally weighted by the TF-IDF (term frequency-inverse document frequency), where the IDF reflects their discriminative abilities in database images and the TF indicates their importance in a query image. Only the feature descriptors, without the scale and orientation, are used in this method.

In the vocabulary tree based image retrieval, since images are essentially represented by a bag of orderless visual words, the geometric relations of the local features or their spatial layout are largely ignored. Therefore, a post re-ranking procedure is often employed to re-order the retrieved candidate images by verifying the geometrical consistency against the query image in order to further improve the retrieval precision. Usually, in the geometrical re-ranking, the local feature descriptors of two images are first matched reliably using conventional methods, then a RANSAC procedure can be employed to fit a global affine transform. The candidate images are re-ranked according to the number of inliers in the RANSAC or fitting errors. This conventional re-ranking approach confronts by two issues. First, this procedure is generally computational intensive because it operates on the high dimensional descriptors. The running time could be even longer than the retrieval. Second, the assumption of a global affine transform between two image may not hold, e.g., for images of a 3D object from different view angles.

SUMMARY

Systems and methods are disclosed to method to search for a query image by detecting local invariant features and local descriptors; retrieving best matching images by incorporating one or more contexts in matching quantized local descriptors with a vocabulary tree; and reordering retrieved images with results from the vocabulary tree quantization.

Advantages of the preferred embodiments may include one or more of the following. The preferred embodiments are very efficient with much lower complexity than conventional systems. These embodiments have excellent scalability for large-scale databases in terms of computational complexity and retrieval accuracy. The retrieval accuracy is significant higher than conventional system for large-scale databases. The contextual statistics differ from existing efforts utilizing geometrical relations among local features in that the system does not assume global geometrical transforms or identify feature groups. The system's contextual statistics involve no high dimensional operations. The system demonstrates excellent scalability in both retrieval accuracy and efficiency in that it leads to consistent large performance gains on the large-scale database, e.g., the mean average precision (mAP) improves by and respectively using various known bench marks. The system also provides an efficient re-ranking approach which takes advantage of the vocabulary tree quantization to conduct fast feature matching. The re-ranking process involves no operations in the high-dimensional feature space and does not assume a global transform between a pair of images, thus, it not only dramatically reduces the computational complexity but also improves the retrieval precision. In sum, the system enables the exploration of rich and discriminative contextual information pertinent to individual images to boost the performance. Such information is incorporated effectively and efficiently for retrieval on large-scale image databases.

BRIEF DESCRIPTION OF THE DRAWINGS

The present invention described herein will become apparent from the following detailed description considered in connection with the accompanying drawings, which disclose several embodiments of the invention. It should be understood, however, that the drawings are designed for the purpose of illustration and not as limits of the invention.

DESCRIPTION

Figure 1:
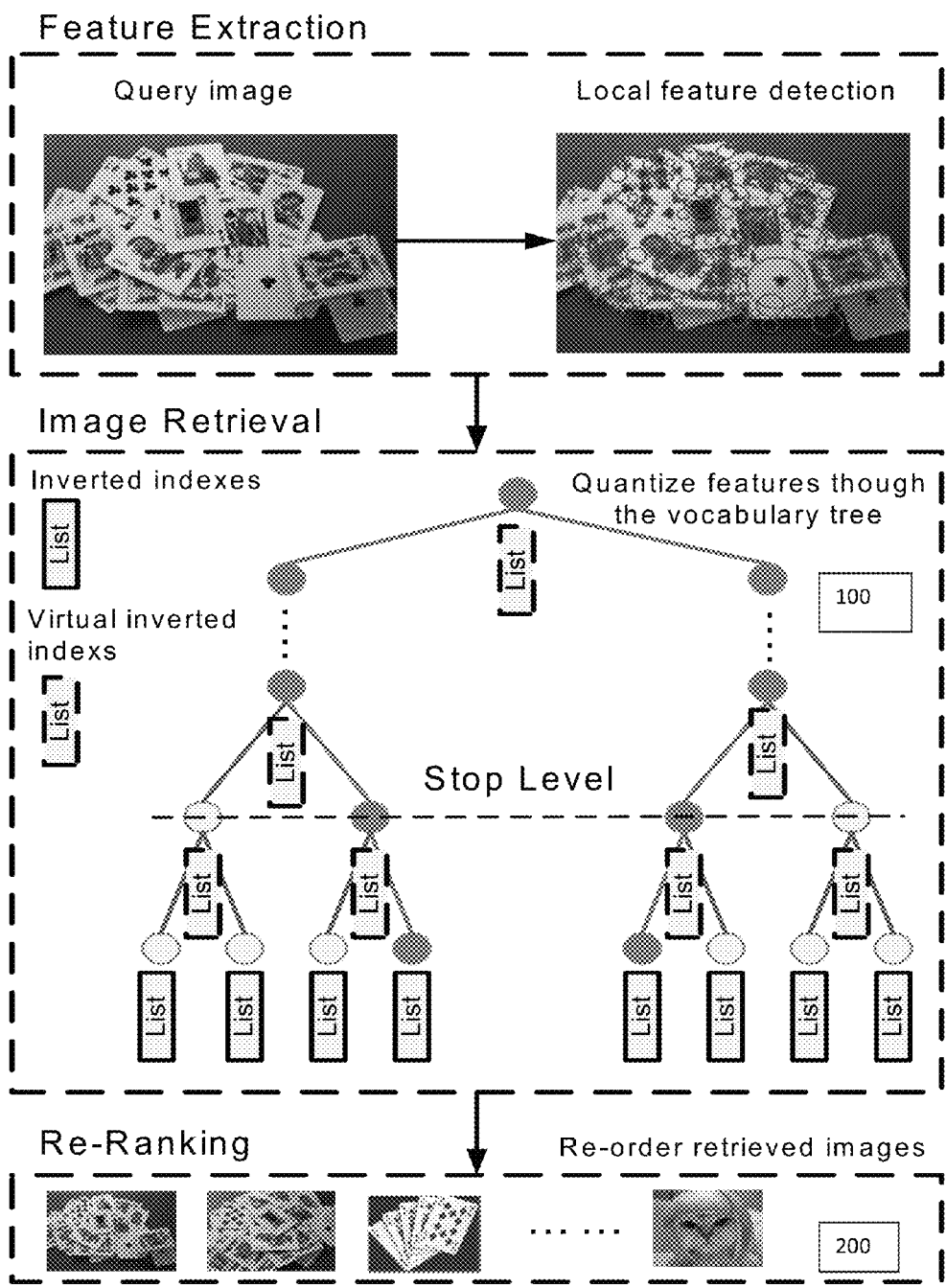
FIG. 1 shows an exemplary image retrieval system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

FIG. 1 shows an exemplary image retrieval system. The system performs image retrieval from millions of database images. The system uses a vocabulary tree based approach with contextual weighting of local features in both descriptor and spatial domains. One embodiment incorporates efficient statistics of neighbor descriptors both on the vocabulary tree and in the image spatial domain into the retrieval. These contextual cues substantially enhance the discriminative power of individual local features with very small computational overhead. Experiments on benchmark datasets, i.e., the UKbench, Holidays, and a new Mobile dataset, show that the system of FIG. 1 reaches state-of-the-art performance with low computation requirements. Furthermore, the system demonstrates excellent scalability in terms of both retrieval accuracy and efficiency on large-scale experiments using 1.26 million images from the ImageNet database as distractors.

The system of FIG. 1 uses two types of image-dependent contextual information of local features to boost their discriminative ability. The context is defined by neighboring local features, both in terms of the vocabulary tree and in terms of the spatial image domain. Even for identical local features, their importance varies across images depending on 1) the image-specific frequencies of similar features, and 2) the compatibility of the spatial layout of adjacent features. For example, features detected in large textural regions like grass or carpets are generally not very informative for retrieval, in contrast, a small grass region on a book cover or certain special patterns on carpets could be quite helpful. To address either of these two issues, the system uses a descriptor contextual weighting (DCW) and a spatial contextual weighting (SCW) of local features. The DCW leverages the frequencies of descriptors' quantization paths on a vocabulary tree in one image, where less informative features are softly downweighted. The SCW utilizes efficient spatial contextual statistics for each local feature, including the density of its adjacent features and their scales and orientations. These statistics are purely local and translation, scale, and rotation invariant, which preserve rich descriptive information of single local features.

These two methods, descriptor and spatial contextual weighting, are complimentary to each other since they rely on different cues. Integrating them in the vocabulary tree based retrieval improves the performance remarkably with small computational overhead compared with conventional systems.

Turning now to FIG. 1, local feature detection is performed on each image. Then, a large vocabulary tree is trained offline for local invariant descriptors by hierarchical K-means clustering. Then database images are indexed to the tree nodes using inverted index files. During operation, given a query image, the system first detects local invariant features and their descriptors. These descriptors are quantized by the vocabulary tree 100. With the help of the inverted index files, the similarity of the local features and the tree nodes (visual words) are accumulated to vote for the similar image. Those images with highest similarity scores are returned as the retrieval results. A post ranking process 200 is then applied to re-order the top retrieved images.

The conventional spatial verification approaches to re-rank the retrieval results require matching the local features with their high-dimensional descriptors and fit certain spatial transform model. In contrast, the preferred embodiments approximate and accelerate the feature matching by taking advantage of the vocabulary tree quantization results which are already available after the retrieval. Thus, the instant re-ranking method is much more efficient and yields similar performance.

The retrieval procedure measures the similarity of local descriptors. Conventional methods employ the term frequency—inverse document frequency (TF-IDF), which is calculated from the database images, to weigh the similarity of pairs of matched descriptors quantized to the same tree node. This may not be sufficient for large-scale image retrieval. To better distinguish the images, the system uses two methods that apply image specific weighting (101 in FIG. 2A) and local context statistics (102 in FIG. 2B), to enhance the discriminative power of a single local invariant descriptor.

Figure 2A:
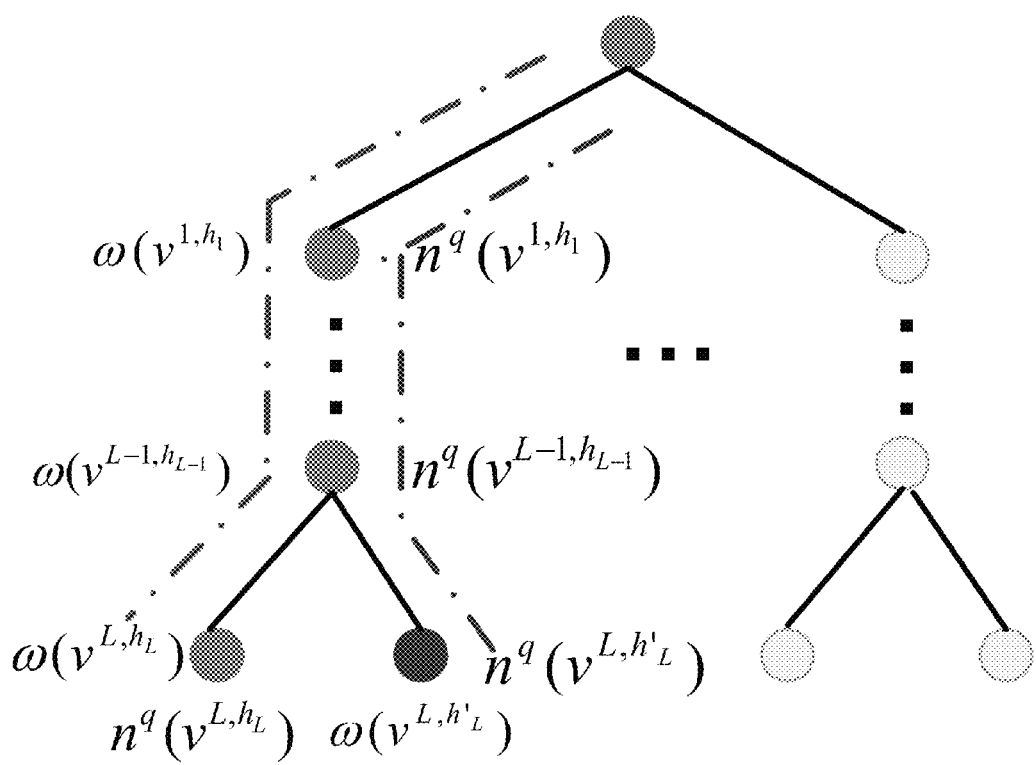
FIG. 2A illustrates an exemplary descriptor contextual weighting.

FIG. 2A illustrates an exemplary descriptor contextual weighting. In this example, T is a vocabulary tree obtained by hierarchical K-means clustering of local descriptors (extracted from a separate dataset), with a branch factor K and depth L. Each node $V^{l,h_l}$ (v for short) in the tree represents a visual word, where l indicates its layer and $h_l$ is the node index at that layer. Tree nodes and visual words are not discerned in the following descriptions.

A query image q is represented by a bag $I_q$ of local descriptors $\{X_i\}i\in I_q$, in our case $x_i \in R^D$ represents SIFT descriptors of dimension D=128. Each $x_i$ is mapped to a path of visual words from the root to a leaf of T, resulting in the quantization $T(x_i)=\{v_i^{l,h_l}\}_{l=1}^{L_i}$. $L_i \leq L$ since the tree may be incomplete. Thus, a query image is eventually represented by the set of node paths obtained from its descriptors, i.e., $\{T(x_i)\}i\in I_q$.

The database images are denoted by $\{d^m\}_{m=1}^M$, and the superscript m is omitted when the context is clear. Following the same hierarchical quantization procedure, the local descriptors $y_j$ in d are mapped to the collection of node paths $\{T(y_j)\}_{j\in I_d}$. The similarity score sim(q,d) between query q and database image d is specified by the average matching score among all pairs of descriptors or node paths:

$$sim(q,d) \doteq \frac{1}{|I_q||I_d|} \sum_{i\in I_q, j\in I_d} f(x_i, y_j), \quad (1)$$

where the matching function $f$ of two descriptors can be further expressed by a matching function $f_v$ on tree nodes:

$$f(x_i, y_j) \doteq f_T(T(x_i), T(y_j)) \doteq \sum_{v_i \in T(x_i), v_j \in T(y_j)} f_v(v_i, v_j). \quad (2)$$

$f_v$ is defined via a weighting function w(v) over visual words v:

$$f_v(v_i, v_j) = w(v_i) 1(v_i = v_j), \quad (3)$$

where $1(\cdot)$ is the indicator function. The following expression is used:

$$w(v) = idf(v) = \log\left(\frac{M}{M_v}\right), \quad (4)$$

where M is the total number of database images and $M_v$ is the number of images containing at least one descriptor that quantizes to the node v; it is computed recursively for non-leaf nodes. Multiple descriptors quantized to the same visual word v in the query image will contribute w(v) multiple times to the matching score, which is equivalent to the term frequency, TF.

Usually, the number of descriptors in a query is up to several thousands, so the accumulation of matching scores in Eq. (1) is akin to a voting procedure for the most similar images in the database. The images d with highest similarity sim(q,d) are returned as the retrieval set.

Since the vocabulary tree is very large, the number of images whose descriptors are quantized to a particular node is rather small. Therefore, inverted index files attached to leaf nodes allow a very efficient implementation of this voting procedure. Due to efficiency concerns, only deeper layer nodes are used in Eq. (2), using a stop level or stop list. Using the leaf nodes only in Eq. (2) yields fastest retrieval speed, but usually with limited accuracy. The storage of inverted index files is proportional to the total number of descriptors in the database, i.e., $\Sigma_{m=1}^{M} |I_{d^m}|$.

Next, descriptor contextual weighting is discussed. The discriminative power of descriptors, even the identical ones, varies in different images. Descriptors detected on large textural regions, e.g., carpets, grass, and soils, are less informative, although their numbers could dominate in an image. In the TF-IDF weighting, their IDFs, which are not necessarily small when calculated from a large image database, contribute to the matching score many times via their TFs. This over-counting may lead to noisy retrieval results. Such descriptors should be down-weighted to avoid this. Different from a flat codebook, for a large tree T, these descriptors fall into a number of leaf nodes or sub-trees, so the burstiness of visual words seldom happens with leaf nodes, and penalizing the IDF according to visual word counts in the database is not effective with large trees.

In one embodiment, inverse weighted counts of a node path are incorporated as descriptor contextual weights in addition to the IDF weight. In this embodiment, descriptor $x_i$ in q and $y_j$ in d are quantized to the same node $v \in T(x_i) \cap T(y_j)$, with the knowledge of q and d the weighting function w(v) in Eq. (4) is modified to:

$$w_{i,j}^{q,d}(v) = w_i^q w_j^d idf(v). \quad (5)$$

Denoting $n^q(v)$ as the number of descriptors in image q that are quantized to v, the DCW term $w_i^q$ is defined based on the node counts along the quantization path of $x_i$:

$$w_i^q = \sqrt{\frac{\sum_{v \in T(x_i)} \omega(v)}{\sum_{v \in T(x_i)} \omega(v) \times n^q(v)}}, \quad (6)$$

where ω(v) is a weighting coefficient, set to idf(v) empirically. The weight $w_i^q$ depends on the descriptor only, and is shared for all nodes v along the path $T(x_i)$. As shown in FIG. 2A, if two descriptors $x_i$ and $x_l$ only differ at the leaf node, their common parent node will have different weights $w_{i,j}^{q,d}(v)$ and $w_{l,j}^{q,d}(v)$ in Eq. (5).

The choice of using inverse weighted counts of a node path in Eq. (6) is justified by the characteristics of vocabulary trees. Since the tree is deep, the majority of leaf nodes (over 95% in the experiments) only have one descriptor being quantized to it for one image. In view of this, Eq. (6) actually takes into account the descriptors quantized to neighbor tree nodes to determine the importance of a descriptor in retrieval, where nodes in a sub-tree with more descriptors is softly down-weighted compared to a sub-tree with fewer descriptors. The square root in Eq. (6) is due to the weighting of both query and database images. In practice, the descriptor contextual weights are mainly determined by the tree nodes in deeper layers.

Figure 2B:
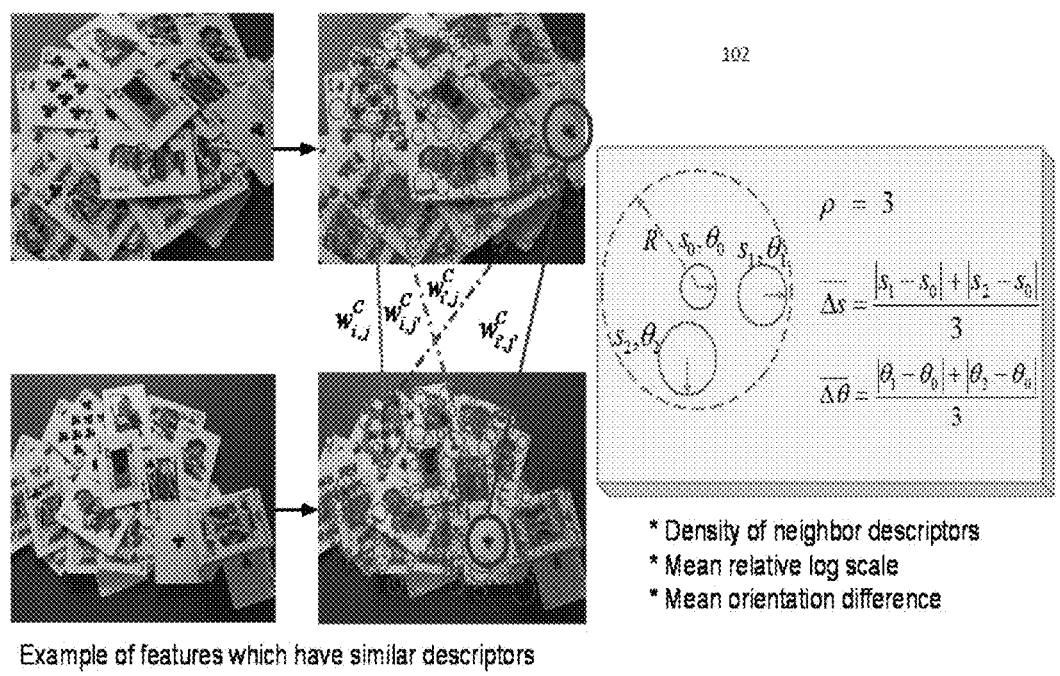
FIG. 2B illustrates an exemplary spatial contextual weighting.

Next, spatial contextual weighting is discussed. FIG. 2B illustrates an exemplary spatial contextual weighting. Local descriptors are not independent and their neighborhoods contain much rich information. As shown in FIG. 2B, descriptors on clubs are all similar and unable to distinguish club A or club 8, unless we explore their neighborhoods. Nevertheless, in general it is costly to exploit high order information of local descriptors. We propose to employ simple statistics in the local neighborhood of an invariant feature as its spatial context to enhance its discriminative ability.

A SIFT feature $f_0 = \{x_0, u_0, s_0, \theta_0\}$ includes the descriptor $x_0 \in R^D$, location $u_0$, characteristic scale $s_0$ (in the log domain), and orientation $\theta_0$. Let $C(f_0)$ denote the neighborhood of this feature given by the disc $(u_0, R)$. Empirically we set the radius $R = 12 \times 2^{s_0}$ (maximum 150 pixels). We calculate 3 statistics of $C(f_0)$, i.e., the descriptor density ρ, the mean relative log scale $\overline{\Delta s}$, and the mean orientation difference $\overline{\Delta \theta}$, w.r.t $f_0$, defined as $$\rho = |C(f_0)|, \quad (7)$$

$$\overline{\Delta s} = \frac{1}{|C(f_0)|} \sum_{f \in C(f_0)} |s - s_0|, \quad (8)$$

$$\overline{\Delta \theta} = \frac{1}{|C(f_0)|} \sum_{f \in C(f_0)} |\theta - \theta_0|, \quad (9)$$

where $|C(f_0)|$ is the number of descriptors within $(u_0, R)$. These statistics are translation, scale and rotation invariant.

Given two descriptors quantized to the same tree node, the consistency of their local neighborhoods is measured and a spatial context term $w_{i,j}^C$ is added in the matching score. The matching for each statistic, in the range of [0,1], is defined as follows $$w_{i,j}^\rho = \frac{\min(\rho_i, \rho_j)}{\max(\rho_i, \rho_j)}, \quad (10)$$

$$w_{i,j}^s = \frac{\min(\overline{\Delta s}_i, \overline{\Delta s}_j)}{\max(\overline{\Delta s}_i, \overline{\Delta s}_j)}, \quad (11)$$

$$w_{i,j}^\theta = \frac{\min(\overline{\Delta \theta}_i, \overline{\Delta \theta}_j)}{\max(\overline{\Delta \theta}_i, \overline{\Delta \theta}_j)}. \quad (12)$$

Thus, the matching score of the spatial context is given by $$w_{i,j}^C = w_{i,j}^\rho w_{i,j}^s w_{i,j}^\theta. \quad (13)$$

Plug it into Eq. (5), the final matching function is updated to $$w_{i,j}^{qd}(v) = w_{i,j}^C w_j^d idf(v). \quad (14)$$

These simple contextual statistics effectively enhance the descriptive ability of individual features with a small computational overhead. It avoids explicit identification of reliable feature groups as required in conventional systems. In addition, these statistics are purely local. There is no need to implicitly assume a global geometrical transform exists among all descriptors. The search of neighbor features $f \in C$ ($f_0$) is shared by the 3 statistics and can be computed efficiently. In the inverted index files, the system stores $\rho$, $\overline{\Delta s}$, and $\overline{\Delta \theta}$ for each descriptor in the database and quantizes each of them to one byte, so there are 3 additional bytes per descriptor in one embodiment.

Turning now to the post-ranking process 200 of FIG. 1, conventional post ranking methods verify the geometrical relation of local descriptors by fitting a global transform of the query image and the retrieved images. There are 3 difficulties: 1) the computational complexity is too high, i.e., the re-ranking time is much longer than the retrieval; 2) the assumption of a global transform may not hold, then the post ranking has no effect to those cases; 3) it is not straightforward how to combine the original retrieval rank and the post verification rank.

Figure 3:
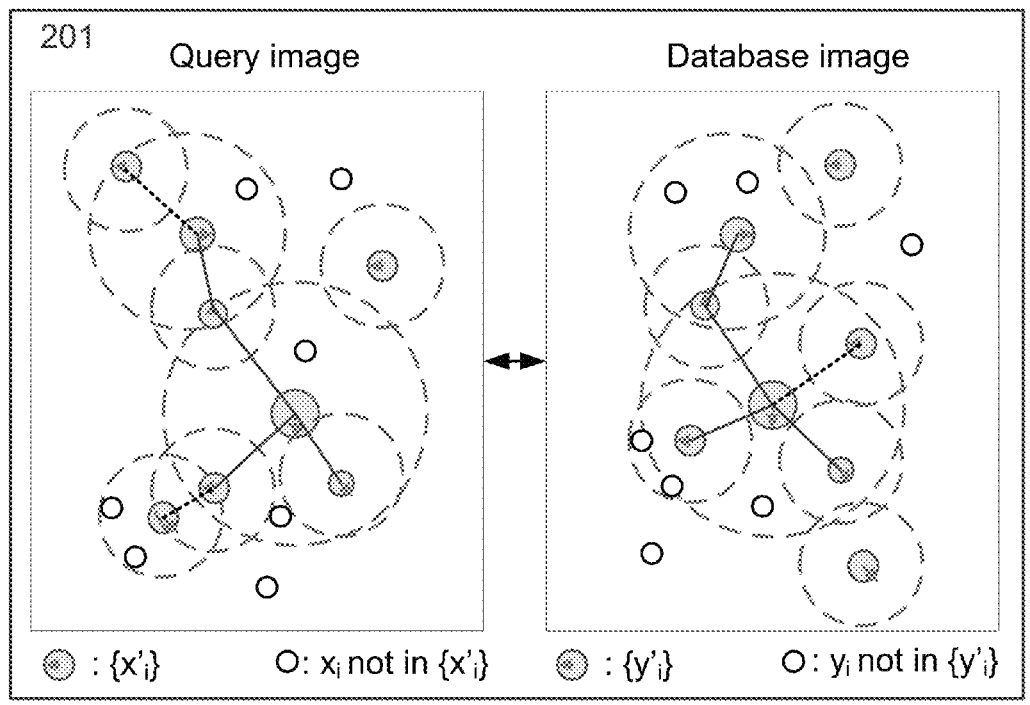
FIG. 3 shows an exemplary efficient re-ranking in the vocabulary tree based image retrieval system.
Figure 4:
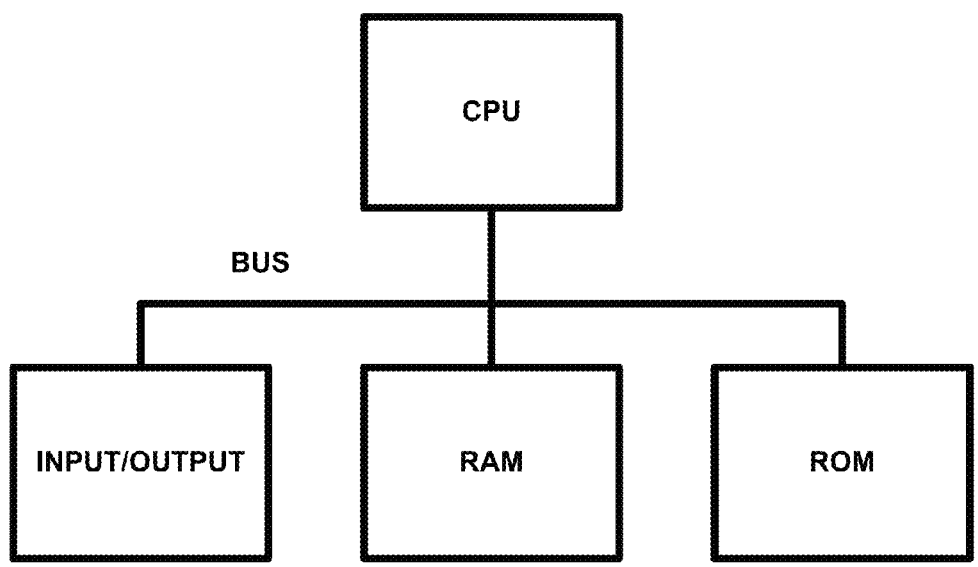
FIG. 4 shows an exemplary computer system to perform image retrieval.

In the preferred embodiment, a fast post ranking method is used to benefit from the tree quantization to select a small subset of local descriptors on which the system performs SIFT feature matching. The node weights of matched SIFT features in the intersection of two sub graphs specified by the neighborhood relations are added to the matching score again to re-order the top candidates. An illustration is shown in 201 (FIG. 3).

In the efficient re-ranking method for vocabulary tree based image retrieval, the system uses the tree quantization to select a small subset of matched local features. The system verifies the consistency of their spatial neighborhoods and re-orders the candidates by augmenting their matching similarity scores. The method improves the retrieval precision with limited computational overhead. The experiments on two large-scale datasets, retrieving the same objects or landmark buildings demonstrate promising performance.

Given the top candidate images, an efficient re-ranking method can be used to re-order them according to the local geometrical consistency of $\{x_i\}$ and $\{y_j^m\}$. First the system obtains a small subset of "matched" local descriptors w.r.t. the vocabulary tree quantization, namely, the descriptors in two images are marked as "matched" if they are quantized to a unique tree node at the deep levels of the tree. Afterwards, the system constructs two sub-graphs of these matched features based on their spatial neighborhood relations. The IDF weights of matched features in the intersection of two sub graphs are weighted by the ratio of common neighbor features and added to the overall image similarity score again to re-order the top candidates.

In one implementation, for the query q and a candidate $d^m$, the system calculates the intersection of all node paths $$\{v_i\}_{i \in I_q} \text{ and } \{v_j^m\}_{j \in I_d^m},$$

and only select those nodes (with depth l>L−3) whose $n_I^q(v^{l,h_l})=1$ and $n_I^d(v^{l,h_l})=1$, denoted by $\{v^{l',h'}\}$. Here $n_I^q$ and $n_I^d$ indicate the number of local features quantized to a particular tree node. As the vocabulary tree is quite deep, the subsets of descriptors $\{x'_i\}$ and $\{y'_j\}$ that correspond to $\{v^{l',h'}\}$ are regarded roughly matched and only around 10%-20% of the initial feature sets. Then the system builds two graphs from matched $\{x'_i\}$ and $\{y'_j\}$ where $x'_i$ links to $x''_i$ which is in its spatial neighborhood $C(x'_i)$. Here, $C(f)$ denotes the neighborhood of one feature given by the disc (u,R). Empirically the system sets the radius R=12×2^s (maximum 150 pixels). Finally, the system calculates the intersection of these 2 graphs and add the weighted $idf(v^{l',h'})$ to the matching score $sim(q,d^m)$ to re-order the top returned images. The final similarity score of two images is defined as $$\overline{sim}(q, d^m) \doteq sim(q, d^m) + \sum_{\{x'_i\}} \alpha(x'_i) idf(v^{l',h'}), \quad (15)$$

where $$\alpha(x'_i) = \frac{|\{x''_i \mid x''_i \in C(x'_i) \text{ and } y''_i \in C(y'_i)\}|}{|C(x'_i)|}$$

and $x''_i$ matches to $y''_i$, the ratio of common neighbors of $x'_i$ in the query and its matched feature $y'_i$ in the database image.

FIG. 3 shows an illustrative example. The green circles indicate the matched SIFT features by the tree quantization and they have the one-on-one correspondences in q and d. According to their spatial neighborhoods drawn as orange dash circles, the features with larger common neighborhood contribute more to the final re-ranking similarity score. When the global transform assumption does not hold, the number of inliers in the RANSAC could be small and unable to reliably re-rank the candidates. In such cases, this re-ranking method allows local deformation and promotes those candidates with large consistent local image regions. Furthermore, the computation of the tree based quantization and finding out the spatial neighborhoods of local features are shared with the retrieval using spatial contextual weighting, thus, the induced computation overhead is quite limited.

The efficient re-ranking process takes advantage of the vocabulary tree quantization to conduct fast feature matching. The re-ranking process involves no operations in the high-dimensional feature space and does not assume a global transform between a pair of images, thus, it not only dramatically reduces the computational complexity but also improves the retrieval precision.

By taking advantage of the tree quantization to select a small set of matched local features and to verify the consistency of their individual spatial local neighborhoods, the system uses the matched local features with a more consistent neighborhood and contributes more to the matching score to re-rank the candidate images. The process does not resort to the high dimensional descriptors, thus it is very efficient. In addition, the process does not assume a global transform between a candidate image to the query, so it is more general than the RANSAC based method. The proposed re-ranking method is particularly beneficial to a recent large-scale image retrieval algorithm where the spatial neighbors of the local features in the query has been pre-calculated in spatial contextual weighting.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments. Thus, the present invention is not intended to be limited to the embodiments shown herein but is to be accorded the widest scope consistent with the principles and novel features disclosed herein.

What is claimed is:

1. A method to search for a query image, comprising detecting local invariant features and local descriptors;
retrieving best matching images by incorporating one or more contexts in matching quantized local descriptors with a vocabulary tree;
reordering retrieved images with results from the vocabulary tree quantization;
measuring similarity of local descriptors through image specific descriptor weighting; and
comprising v, where weight $w_i^q$ is defined based on the node counts along the quantization path of $x_i$, comprising determining $$w_i^q = \sqrt{\frac{\sum_{v \in T(x_i)} \omega(v)}{\sum_{v \in T(x_i)} \omega(v) \times n^q(v)}},$$

where $\omega(v)$ is a weighting coefficient set to $idf(v)$ empirically, where weight $w_i^q$ depends on the descriptor only, and is shared for all nodes v along the path $T(x_i)$ and where $n^q(v)$ represents a number of descriptors in image q that are quantized to v.

2. The method of claim 1, comprising providing an image specific weighting of local features to reflect the local feature discriminative power in different images.

3. The method of claim 1, comprising matching local spatial contexts of a feature, including density of neighbor's features, mean scales and orientation differences.

4. The method of claim 1, comprising reusing local feature quantization provided by the vocabulary tree and contexts to perform a fast re-ranking for top retrieved images.

5. The method of claim 1, comprising generating inverted index files for the vocabulary tree.

6. The method of claim 5, comprising training the vocabulary tree offline for local invariant descriptors by hierarchical K-means clustering.

7. The method of claim 5, comprising indexing database images to tree nodes using the inverted index files.

8. The method of claim 1, wherein the vocabulary tree comprises inverted index files, comprising accumulating a similarity score of local features and tree nodes (visual words) vote for an image and providing images with highest similarity scores as retrieval results.

9. The method of claim 1, comprising performing re-ranking to select a subset of local descriptors for SIFT feature matching.

10. The method of claim 9, comprising adding node weights of matched SIFT features in an intersection of two sub graphs specified by neighborhood relations to a matching score to re-order the top candidates.

11. The method of claim 1, comprising measuring similarity of local descriptors spatial context statistics.

12. The method of claim 11, comprising builds two graphs from matched $\{x'_i\}$ and $\{y'_j\}$ where $x'_i$ links to $x''_i$ which is in a spatial neighborhood $C(x'_i)$, where $C(f)$ denotes a neighborhood of one feature given by a disc $(u, R)$.

13. The method of claim 12, comprising determining an intersection of the two graphs and adding a weighted $idf(v^{l'}, h')$ to a matching score $sim(q, d^m)$ to re-order top returned images.

14. The method of claim 12, comprising determining a final similarity score of two images as $$\overline{sim}(q, d^m) \doteq sim(q, d^m) + \sum_{\{x'_i\}} \alpha(x'_i) idf(v^{l'}, h')$$

where $$\alpha(x'_i) = \frac{|\{x''_i \mid x''_i \in C(x'_i) \text{ and } y''_i \in C(y'_i)\}|}{|C(x'_i)|}$$

and $x''_i$ matches to $y''_i$, the ratio of common neighbors of $x'_i$ in the query and its matched feature $y'_i$ in the database image.

* * * * *